US012295509B2

(12) United States Patent
Berglund et al.

(10) Patent No.: US 12,295,509 B2
(45) Date of Patent: May 13, 2025

(54) SYSTEMS AND METHODS FOR LOCKING A SENSOR TO A BASE

(71) Applicant: InVue Security Products Inc., Charlotte, NC (US)

(72) Inventors: David N. Berglund, Indian Trail, NC (US); Matthew Thomas Kerley, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 147 days.

(21) Appl. No.: 17/853,396

(22) Filed: Jun. 29, 2022

(65) Prior Publication Data

US 2022/0322847 A1 Oct. 13, 2022

Related U.S. Application Data

(63) Continuation of application No. 16/144,481, filed on Sep. 27, 2018, now Pat. No. 11,399,640, which is a
(Continued)

(51) Int. Cl.
*A47F 7/024* (2006.01)
*E05B 73/00* (2006.01)
(Continued)

(52) U.S. Cl.
CPC .............. *A47F 7/024* (2013.01); *E05B 73/00* (2013.01); *E05B 73/0005* (2013.01);
(Continued)

(58) Field of Classification Search
CPC .. E05B 73/00; E05B 73/0082; E05B 73/0005; E05B 65/00; E05B 45/06;
(Continued)

(56) References Cited

U.S. PATENT DOCUMENTS 1,250,575 A 12/1917 Fish
1,510,561 A * 10/1924 Segal ...................... E05B 63/12
70/105
(Continued)

FOREIGN PATENT DOCUMENTS

CA 2586077 A1 * 6/2006 ............. E05B 7/003
CN 201489627 U 5/2010
(Continued)

OTHER PUBLICATIONS

JP-H07266181-A; Machine Translation; (Year: 1995).*
(Continued)

*Primary Examiner* — Taylor Morris
(74) *Attorney, Agent, or Firm* — InVue Security Products Inc.

(57) ABSTRACT

Embodiments of the present invention are directed to merchandise display systems and methods for displaying an article of merchandise. In one example, the system includes a sensor configured to be secured to the article of merchandise. The sensor includes a first engagement member. The system also includes a base configured to removably support the sensor thereon. The base includes a second engagement member configured to releasably engage the first engagement member such that the sensor is locked to the base. The sensor is configured to rotate with respect to the base while locked thereto.

20 Claims, 14 Drawing Sheets

Related U.S. Application Data continuation of application No. 15/505,181, filed as application No. PCT/US2015/046684 on Aug. 25, 2015, now Pat. No. 10,098,481.

(60) Provisional application No. 62/117,249, filed on Feb. 17, 2015, provisional application No. 62/060,989, filed on Oct. 7, 2014, provisional application No. 62/042,320, filed on Aug. 27, 2014.

(51) Int. Cl.
*G03B 13/14* (2021.01)
*G08B 13/14* (2006.01)

(52) U.S. Cl.
CPC .......... *E05B 73/0082* (2013.01); *G08B 13/14* (2013.01); *G08B 13/1418* (2013.01); *G08B 13/1445* (2013.01); *G08B 13/1463* (2013.01)

(58) Field of Classification Search
CPC ........ E05B 67/36; E05B 67/003; E05B 71/00; E05B 45/005; A47F 7/024; A47F 3/002; F16M 11/041; F16M 2200/02; G08B 13/1463; G08B 13/1418; G08B 13/1445; G08B 13/14; B62D 53/085
USPC ........ 248/551, 553; 70/231, 232, 14, 18, 19, 70/57, 58
See application file for complete search history.

(56) References Cited

U.S. PATENT DOCUMENTS 1,512,141 A * 10/1924 Segal .................. E05B 17/2088 292/49
1,764,367 A 2/1928 Szymanski
2,061,638 A 11/1936 Segal
2,478,339 A * 8/1949 Sullivan .............. E05B 73/0076 70/230
2,554,306 A 5/1951 Mack
2,630,699 A 3/1953 Langdon
2,706,392 A 4/1955 Lucas et al.
2,873,822 A 2/1959 Sloan
3,338,077 A 8/1967 Kaneda
3,386,274 A 6/1968 McIntyre
3,435,642 A * 4/1969 Pesco .................... E05B 67/003 24/635
3,495,050 A * 2/1970 Bart ...................... H04M 1/667 70/DIG. 72
3,665,736 A * 5/1972 Wilson .................... E05B 73/00 292/259 R
3,706,211 A 12/1972 Owen
3,765,196 A * 10/1973 Balicki ................. E05B 67/003 70/49
3,820,283 A 6/1974 Acerra et al.
3,832,872 A 9/1974 Gerlach
3,904,230 A * 9/1975 Fane ......................... E05C 3/40 292/49
3,913,880 A 10/1975 Lucasey et al.
3,922,897 A 12/1975 Mickelson
3,953,990 A * 5/1976 Nagel .................. A01K 27/003 70/45
3,990,276 A 11/1976 Shontz
4,030,321 A 6/1977 Kenyon
4,066,231 A 1/1978 Bahner et al.
4,067,213 A 1/1978 Little
4,075,878 A * 2/1978 Best ...................... E05B 67/003 70/369
4,112,716 A * 9/1978 Wippich ............... E05B 67/003 70/52
4,132,093 A 1/1979 McDorman, Sr.
4,136,539 A * 1/1979 Nobles .................. E05B 67/003 70/18
4,248,067 A 2/1981 Sears
4,269,048 A 5/1981 McDorman
4,305,266 A 12/1981 Lockwood
4,328,687 A 5/1982 Ritchie
4,441,344 A 4/1984 Kurpershoek
4,697,444 A 10/1987 Maffey
4,754,628 A 7/1988 Siegel
4,882,921 A 11/1989 Wopinski
4,934,649 A 6/1990 Stout et al.
4,979,382 A 12/1990 Perry
5,090,222 A 2/1992 Imran
5,170,650 A 12/1992 Kortenbrede
5,214,945 A 6/1993 Martin
5,457,975 A 10/1995 Berger et al.
5,491,992 A 2/1996 Mandall
5,543,782 A 8/1996 Rothbaum et al.
5,568,740 A * 10/1996 Lin ....................... E05B 67/003 70/49
5,701,769 A * 12/1997 Hall ........................ E05B 73/00 70/58
5,709,110 A 1/1998 Greenfield et al.
5,829,280 A 11/1998 Chen
5,992,187 A 11/1999 Derman
6,209,367 B1 4/2001 Hyatt, Jr. et al.
6,209,370 B1 4/2001 Larson et al.
6,212,922 B1 4/2001 Miao
6,419,258 B1 7/2002 Grote
6,474,118 B2 * 11/2002 Martinez ................... E05C 3/06 292/49
6,598,433 B1 7/2003 Malvasio
6,761,050 B2 7/2004 Rosenberg
6,848,282 B2 2/2005 Palzkill et al.
6,925,842 B1 8/2005 Hillabush et al.
7,202,786 B2 4/2007 Marszalek et al.
7,209,038 B1 4/2007 Deconinck et al.
7,497,103 B1 * 3/2009 Misner .................... E05B 63/14 70/120
7,626,500 B2 12/2009 Belden, Jr. et al.
7,710,266 B2 5/2010 Belden, Jr. et al.
7,714,722 B2 5/2010 Marszalek et al.
7,740,214 B2 6/2010 Marsilio et al.
7,971,845 B2 * 7/2011 Galant .................... A47F 7/024 248/329
7,984,886 B2 7/2011 Lin
7,997,106 B2 * 8/2011 Mahaffey ................ E05B 73/00 70/49
8,056,740 B2 11/2011 Weshler et al.
8,191,851 B2 6/2012 Crown
8,347,669 B2 1/2013 Schmidt
8,528,373 B2 9/2013 Hyatt, Jr. et al.
8,537,012 B2 9/2013 Rapp et al.
8,558,688 B2 10/2013 Henson et al.
8,640,511 B1 2/2014 Derman
8,701,452 B2 4/2014 Foster et al.
8,985,544 B1 3/2015 Gulick, Jr.
9,206,627 B2 * 12/2015 Lin .................... E05B 73/0005
9,353,552 B1 5/2016 Kelsch et al.
9,394,724 B2 7/2016 Herdman
9,443,404 B2 9/2016 Grant et al.
9,747,765 B1 8/2017 Berglund et al.
9,761,101 B2 9/2017 Berglund et al.
D798,636 S 10/2017 Van Landingham, Jr.
9,805,564 B1 10/2017 Berglund et al.
9,811,988 B2 11/2017 Grant et al.
9,818,274 B2 11/2017 Fawcett et al.
9,928,704 B2 3/2018 Berglund et al.
9,972,178 B2 5/2018 Richardson et al.
10,043,358 B1 8/2018 Berglund et al.
10,068,444 B1 9/2018 Berglund et al.
10,078,945 B2 9/2018 Grant et al.
10,098,481 B2 10/2018 Berglund et al.
10,206,522 B2 2/2019 Yang et al.
10,290,192 B2 5/2019 Grant et al.
10,403,105 B2 9/2019 Berglund et al.
10,550,609 B2 * 2/2020 Llewellyn ............... B63B 25/28
11,236,528 B2 * 2/2022 Berglund ............ E05B 73/0017
2003/0221466 A1 * 12/2003 Hyatt, Jr. ........... G07C 9/00658 70/379 R
2005/0073413 A1 4/2005 Sedon et al.
2006/0097875 A1 5/2006 Ott

(56) References Cited

U.S. PATENT DOCUMENTS

| | | | |
|---|---|---|---|
| 2007/0134061 | A1 | 6/2007 | Nance |
| 2008/0142665 | A1 | 6/2008 | Belden et al. |
| 2008/0289379 | A1 | 11/2008 | Martin |
| 2009/0007614 | A1 * | 1/2009 | Armstrong ............ B60P 7/0807 70/287 |
| 2009/0013735 | A1 | 1/2009 | Schmidt |
| 2009/0173868 | A1 | 7/2009 | Fawcett et al. |
| 2009/0229089 | A1 | 9/2009 | Galant |
| 2010/0079285 | A1 | 4/2010 | Fawcett et al. |
| 2010/0176945 | A1 | 7/2010 | Fawcett et al. |
| 2010/0188222 | A1 | 7/2010 | Irmscher et al. |
| 2011/0061427 | A1 | 3/2011 | Mahaffey et al. |
| 2011/0062294 | A1 | 3/2011 | Johnson et al. |
| 2011/0068919 | A1 | 3/2011 | Rapp et al. |
| 2011/0068920 | A1 | 3/2011 | Yeager et al. |
| 2011/0084838 | A1 | 4/2011 | Fawcett |
| 2011/0133050 | A1 | 6/2011 | Eisenberger, Sr. et al. |
| 2011/0187531 | A1 | 8/2011 | Oehl et al. |
| 2011/0254661 | A1 | 10/2011 | Fawcett et al. |
| 2011/0265526 | A1 * | 11/2011 | Zuraski .................. B62H 5/003 70/14 |
| 2011/0309934 | A1 | 12/2011 | Henson et al. |
| 2012/0037783 | A1 | 2/2012 | Alexander et al. |
| 2012/0043451 | A1 | 2/2012 | Alexander et al. |
| 2012/0103031 | A1 * | 5/2012 | Grant ...................... E05B 67/36 70/14 |
| 2012/0103034 | A1 | 5/2012 | Shartel |
| 2012/0119910 | A1 | 5/2012 | Belden, Jr. et al. |
| 2012/0120571 | A1 | 5/2012 | Bisesti et al. |
| 2012/0131967 | A1 | 5/2012 | Sanchez Giraldez |
| 2012/0188082 | A1 | 7/2012 | Berglund et al. |
| 2012/0192600 | A1 | 8/2012 | Johnston et al. |
| 2012/0205326 | A1 | 8/2012 | Richter et al. |
| 2012/0293330 | A1 | 11/2012 | Grant et al. |
| 2013/0026322 | A1 | 1/2013 | Wheeler et al. |
| 2013/0033380 | A1 | 2/2013 | Fawcett et al. |
| 2013/0063267 | A1 | 3/2013 | Yunker et al. |
| 2013/0106120 | A1 | 5/2013 | Stendal |
| 2013/0168527 | A1 | 7/2013 | Wheeler et al. |
| 2014/0059828 | A1 | 3/2014 | Reynolds et al. |
| 2014/0063238 | A1 | 3/2014 | Abdollahzadeh et al. |
| 2014/0118930 | A1 | 5/2014 | Sedon |
| 2014/0260443 | A1 | 9/2014 | Grziwok et al. |
| 2014/0263873 | A1 | 9/2014 | Kim |
| 2014/0328020 | A1 | 11/2014 | Galant |
| 2015/0107317 | A1 * | 4/2015 | Boesel .................... B60R 25/08 70/344 |
| 2015/0208826 | A1 | 7/2015 | Yang et al. |
| 2015/0265073 | A1 | 9/2015 | Tsai |
| 2015/0305518 | A1 | 10/2015 | Galant |
| 2015/0315822 | A1 | 11/2015 | Garthe et al. |
| 2016/0335859 | A1 | 11/2016 | Sankey |
| 2017/0245663 | A1 | 8/2017 | Berglund et al. |
| 2018/0061197 | A1 | 3/2018 | Grant et al. |
| 2018/0283054 | A1 * | 10/2018 | Llewellyn ............... E05B 73/00 |
| 2019/0029446 | A1 | 1/2019 | Berglund et al. |
| 2020/0141159 | A1 * | 5/2020 | Berglund .................. A47F 5/02 |
| 2021/0140202 | A1 | 5/2021 | Hall et al. |

FOREIGN PATENT DOCUMENTS

| | | | | | |
|---|---|---|---|---|---|
| CN | 202257819 | U | | 5/2012 | |
| CN | 203165115 | U | | 8/2013 | |
| CN | 103857862 | A | | 6/2014 | |
| EP | 2400089 | A2 | * | 12/2011 | ............. B62H 5/003 |
| GB | 1565341 | A | * | 4/1980 | ........... E05B 67/003 |
| GB | 2245022 | A | * | 12/1991 | ............. E05B 67/36 |
| GB | 2298675 | A | * | 9/1996 | ............... B60D 1/60 |
| GB | 2363422 | A | | 12/2001 | |
| JP | H07266181 | A | * | 10/1995 | ......... E05B 73/0005 |
| KR | 20120009255 | A | * | 2/2012 | ......... E05B 73/0005 |
| WO | WO-9505515 | A1 | * | 2/1995 | ............... B62H 5/20 |
| WO | 2002/090692 | A2 | | 11/2002 | |
| WO | 2014019072 | A1 | | 2/2014 | |
| WO | 2014078966 | A1 | | 5/2014 | |
| WO | WO-2015044760 | A1 | * | 4/2015 | ........... E05B 17/226 |
| WO | 2015/112336 | A1 | | 7/2015 | |

OTHER PUBLICATIONS

International Search Report and Written Opinion from corresponding International Application No. PCT/US2015/046684, dated Dec. 7, 2015 (9 pages).

Extended European Search Report from corresponding EP Application No. 15835389.6, dated Feb. 19, 2018 (7 pages).

"MTI Freedom LP3 Brochure," Mobile Technologies, Inc., dated Sep. 2009 (1 page).

"MTI Freedom LP3 Product Manual," Mobile Technologies, Inc., dated Mar. 2010 (20 pages).

"MTI Freedom LP3 Product Manual," Mobile Technologies, Inc., dated Mar. 2011 (25 pages).

MTI Freedom LP3 Quick Reference Guide, Mobile Technologies, Inc., dated Feb. 2010 (2 pages).

"MTI Freedom One Product Manual," Mobile Technologies, Inc., dated Jun. 2011 (32 pages).

"MTI Freedom One Product Manual," Mobile Technologies, Inc., dated Jun. 2012 (32 pages).

"MTI Freedom One Sell Sheet," Mobile Technologies, Inc., dated 2012 (2 pages).

First Office Action from corresponding Chinese Patent Application No. 201580053986.1, dated Mar. 5, 2019 (14 pages).

Petition for Inter Partes Review of U.S. Pat. No. 10,098,481, Oct. 4, 2019, 95 pages (IPR2020-00018).

U.S. Pat. No. 483,298 to Brun, Issue Date Sep. 27, 1892 (4 pages).

Excerpt from Merriam-Webster's Dictionary and Thesaurus, Merriam-Webster, Incorporated, dated 2014, p. 351.

Decision Denying Institution of Inter Partes Review of U.S. Pat. No. 10,098,481; Mar. 31, 2020; 31 pages (IPR2020-00018).

U.S. Appl. No. 61/996,963, filed Jan. 24, 2014 (34 pages).

* cited by examiner

SYSTEMS AND METHODS FOR LOCKING A SENSOR TO A BASE

CROSS REFERENCE TO RELATED APPLICATIONS

This application is a continuation of U.S. application Ser. No. 16/144,481 filed on Sep. 27, 2018, which is a continuation of U.S. application Ser. No. 15/505,181, filed Feb. 20, 2017, and now U.S. Pat. No. 10,098,481, which is a 371 National Phase Entry of International Application No. PCT/US2015/046684, filed Aug. 25, 2015, which claims the benefit to priority of U.S. Provisional Patent Application No. 62/042,320 filed on Aug. 27, 2014, U.S. Provisional Patent Application No. 62/060,989 filed on Oct. 7, 2014, and U.S. Provisional Patent Application No. 62/117,249 filed on Feb. 17, 2015, the entire disclosures of which are incorporated herein by reference.

FIELD OF THE INVENTION

Embodiments of the present invention relate generally to security systems and methods for articles of merchandise in a retail environment.

BACKGROUND OF THE INVENTION

Retailers routinely display articles of merchandise, such as telephones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

BRIEF SUMMARY

Aspects and advantages of embodiments of the present disclosure will be set forth in part in the following description, or may be learned from the description, or may be learned through practice of the embodiments.

Embodiments of the present invention are directed to methods and systems for displaying an article of merchandise. In one embodiment, a merchandise display system for displaying an article of merchandise includes a sensor configured to be secured to the article of merchandise. The sensor includes a first engagement member. A base is configured to removably support the sensor thereon, wherein the base includes at least one second engagement member configured to releasably engage the first engagement member such that the sensor is locked to the base. The sensor is configured to rotate with respect to the base while locked thereto.

In another embodiment, a method for displaying an article of merchandise is provided. The method includes securing a sensor to the article of merchandise, wherein the sensor comprises a first engagement member. The method also includes positioning the sensor on a base configured to removably support the sensor thereon, wherein the base comprises at least one second engagement member configured to releasably engage the first engagement member. The method further includes locking the sensor to the base via engagement of the at least one second engagement member with the first engagement member such that the sensor is configured to rotate with respect to the base while locked thereto.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION OF EMBODIMENTS OF THE INVENTION

One or more embodiments of a system for securing an article of merchandise are described below and shown. The article of merchandise M is typically a display model or an operational sample of electronic merchandise, such as portable telephones, smart phones, computers (e.g. notebooks, laptops, tablets, etc.), e-readers, media players, and the like, for a customer to examine before making a decision to purchase the article. The article of merchandise is typically displayed in a manner that permits a prospective purchaser to evaluate the operation and features of the merchandise, while protecting the merchandise from a potential thief. In one embodiment, a sensor with alarming circuitry may be attached to the article of merchandise for detecting various alarming conditions, such as the article being removed from the sensor. A tether may be operably engaged with the sensor at one end, while the opposite end may be secured to a base or other display surface. As explained in further detail below, the alarming circuitry of the sensor may also be configured to detect an alarming condition of the tether, such as cutting or detaching the tether.

Figure 1:
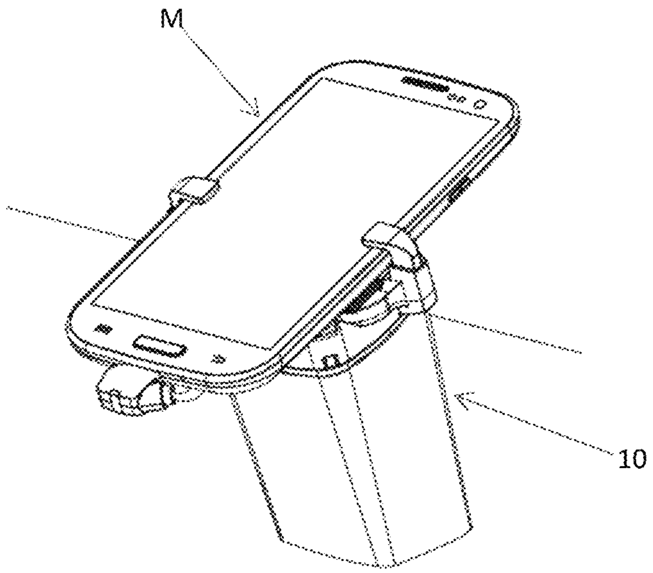
FIGS. 1 and 2 each illustrate a perspective view of a merchandise display system according to certain aspects of the present disclosure.
Figure 2:
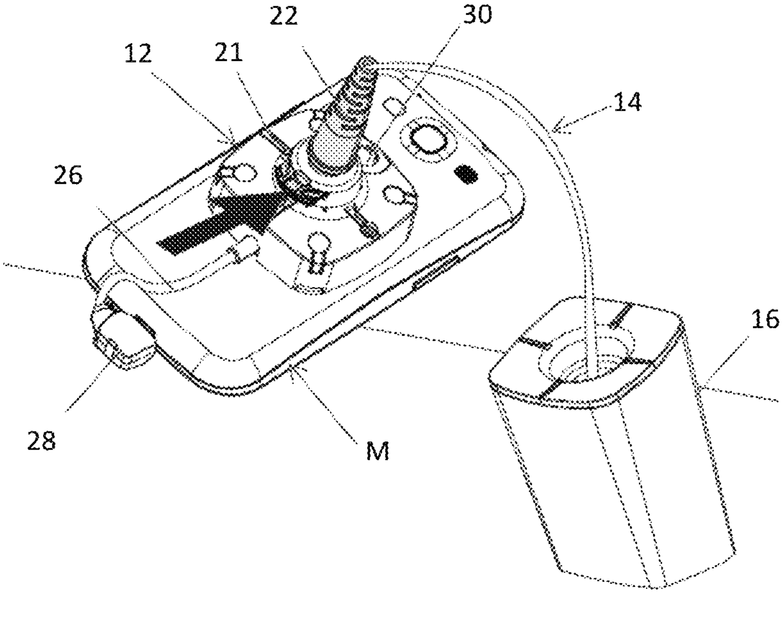
Figure 3:
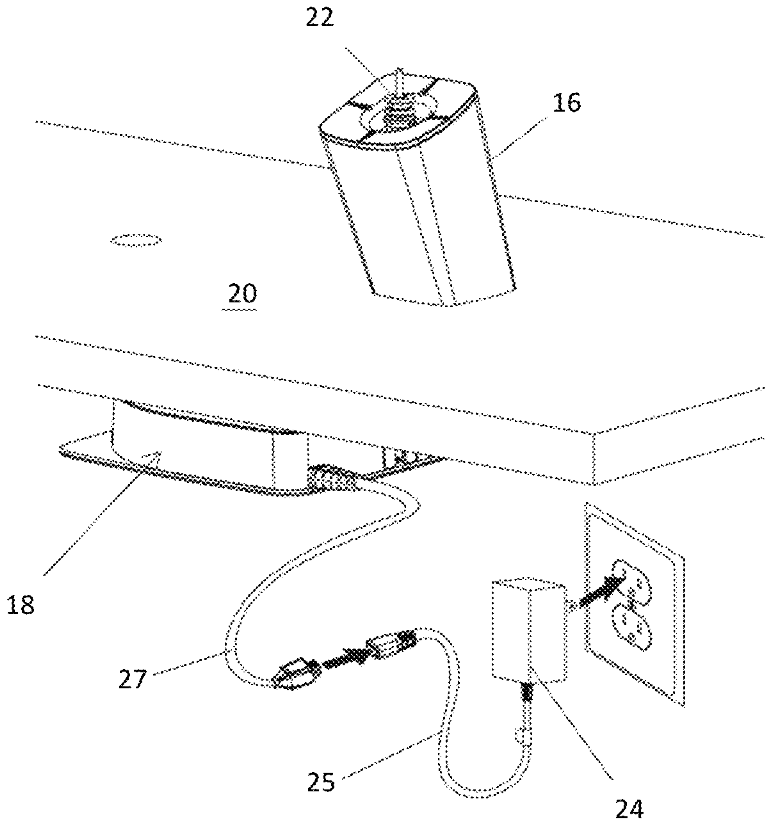
FIG. 3 illustrates a perspective view of a merchandise display system, including a recoiler, according to certain aspects of the present disclosure.
Figure 4:
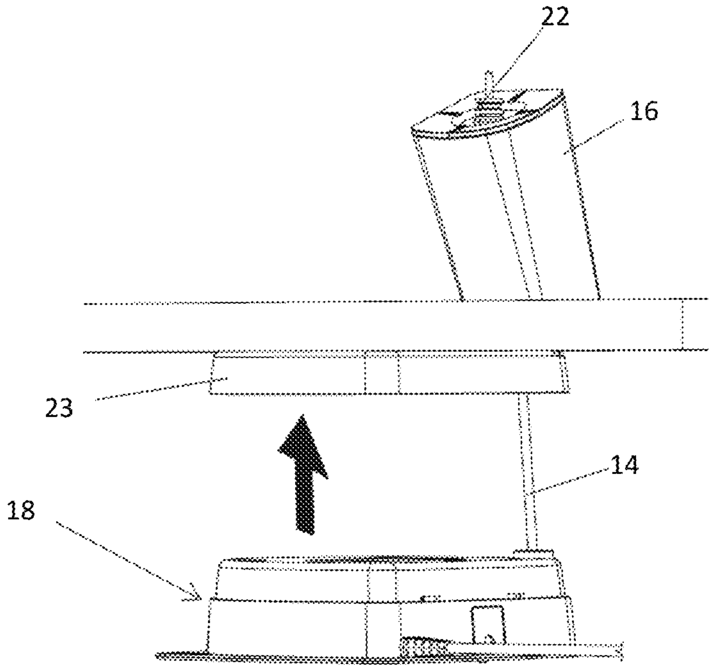
FIG. 4 illustrates a perspective view of a merchandise display system, including a recoiler of FIG. 3, according to certain aspects of the present disclosure.

FIGS. 1-4 illustrate embodiments of a merchandise security system 10 for securing an article of merchandise M from theft or unauthorized removal. The system generally includes a sensor 12, a tether 14, a base 16, and a recoiler 18 as shown in FIGS. 2-4. The sensor 12 is configured to be secured to the article of merchandise M, such as with a pressure-sensitive adhesive (not shown). One end of the tether 14 may be electrically connected to the recoiler 18, while the opposite end of the tether 14 includes a connector or jack 22. The sensor 12 may be electrically connected to the tether 14, such as with the connector 22 as shown in FIG. 2. Thus, the connector 22 may be releasably secured to the sensor 12 to establish electrical communication therebetween. The connector 22 may be further secured in position with a lock mechanism 21, such as a clip, as shown in FIG. 2. As such, when the lock mechanism 21 engages the connector 22, the connector 22 may not be removed from the sensor 12 without first disengaging the lock mechanism 21. The lock mechanism 21 may allow tension to be applied to the tether 14 without causing the connector 22 to become inadvertently disconnected from the sensor 12.

The base 16 is configured to removably support the sensor 12 thereon such that the sensor 12 and article of merchandise M may be removed from the base 16 for inspection and returned to the base 16. The base 16 may define an opening therethrough that allows the tether 14 to extend and retract relative to the base 16. FIGS. 3 and 4 show that the recoiler 18 may be secured below a support surface 20 (e.g., a counter, shelf, or the like). In this regard, the recoiler 18 may include a mounting plate 23 that is configured to be secured to the support surface 20, and the recoiler 18 is configured to engage the mounting plate 23 so as to be secured thereto. As shown in FIG. 3, the recoiler 18 may be electrically connected to a power source that is configured to provide power to the recoiler 18 and to the tether 14. A plug or other connector 24, for example, an AC power plug, may be disposed at the end of an input power cable 25 for electrically connecting the input power cable 25 to an external source of electrical power, for example, a conventional 110V AC power outlet and an input cable 27 of the recoiler 18. In some embodiments, the sensor 12 is electrically connected to a power cable 26 that is configured to provide power to the article of merchandise M. Thus, the power cable 26 may facilitate use of the article of merchandise M on display and charging of the article's battery. FIG. 2 shows that the power cable 26 may include a connector 28 that is configured to operably engage an input port on the article of merchandise M. The alarming circuitry may be configured to detect removal of the connector 28 in some embodiments for generating an audible and/or a visual alarm.

As discussed above, the sensor 12 may include alarming circuitry, processor, central processing unit, or the like that is configured to determine whether various security events have occurred for generating an audible and/or a visual alarm. The sensor 12 may also include an alarm (e.g., a piezoelectric device) that is configured to generate an audible alarm. Thus, the sensor 12 may be configured as "alarm-on-product" whereby the sensor is configured to alarm when attached to the article of merchandise M or detached from the article of merchandise. In some cases, the sensor 12 may include a visual indicator (e.g., an LED) for emitting a visual signal when the alarming circuitry is armed and/or alarming. Moreover, the sensor 12 may include a transfer port 30 that is configured to communicate with a key 32 for arming and/or disarming the alarming circuitry (see, e.g., FIGS. 2 and 8). In one embodiment, the transfer port 30 is configured to communicate wirelessly with a key 32 in order to determine whether the key is authorized to arm and/or disarm the alarming circuitry. According to some embodiments, the key is similar to that described in U.S. Pat. No. 7,737,845, the contents of which are hereby incorporated by reference in their entirety. According to one embodiment, the sensor 12 may include a pressure switch 33 or the like that is configured to detect when the article of merchandise has been removed from the sensor (see, e.g., FIG. 7). The alarming circuitry may be configured to detect the removal of the article M and generate and an audible and/or a visual alarm in response thereto. In other embodiments, the alarming circuitry may be located in the base 16 or at another location whereby the sensor 12 and the alarming circuitry are electrically connected with one another, such as via one or more conductors extending through the tether 14.

Figure 5:
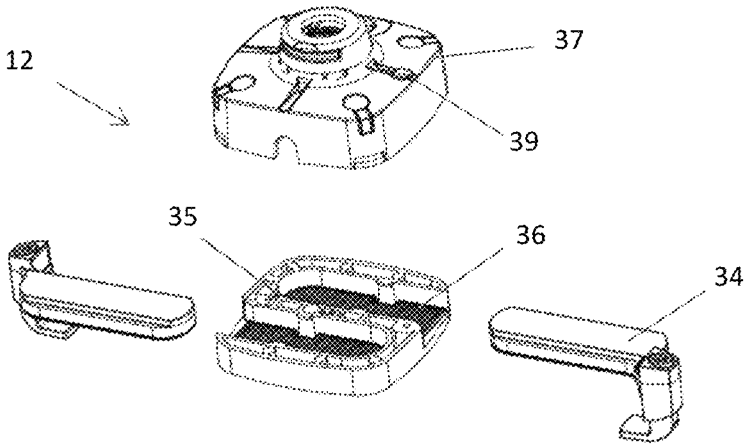
FIGS. 5 and 6 each illustrate an exploded perspective view of a sensor for use with a merchandise display system of FIG. 1, according to certain aspects of the present disclosure.
Figure 6:
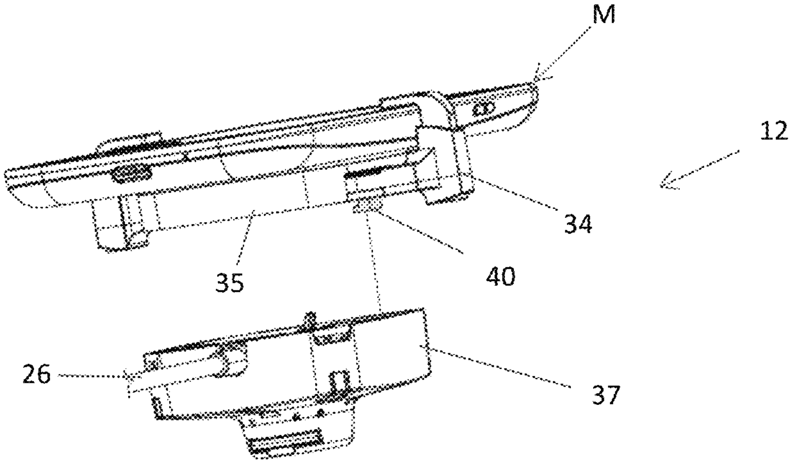
Figure 7:
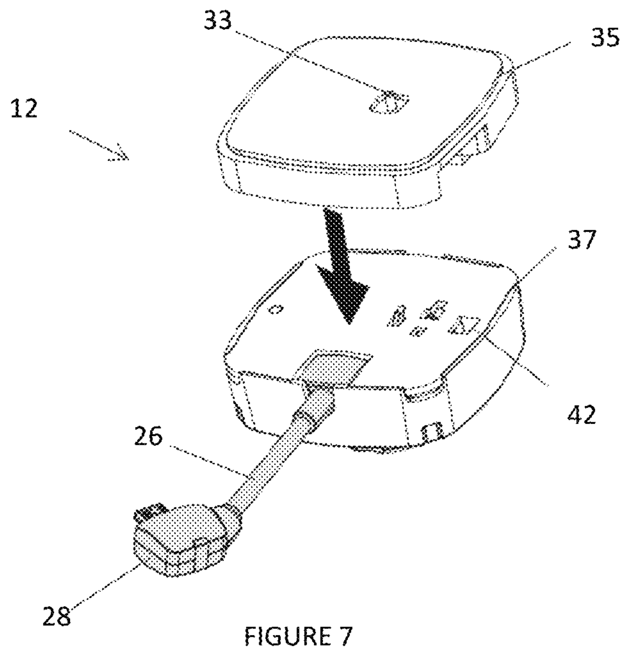
FIG. 7 illustrates an exploded perspective view of a sensor for use with the merchandise display system of FIG. 1, according to certain aspects of the present disclosure.
Figure 8:
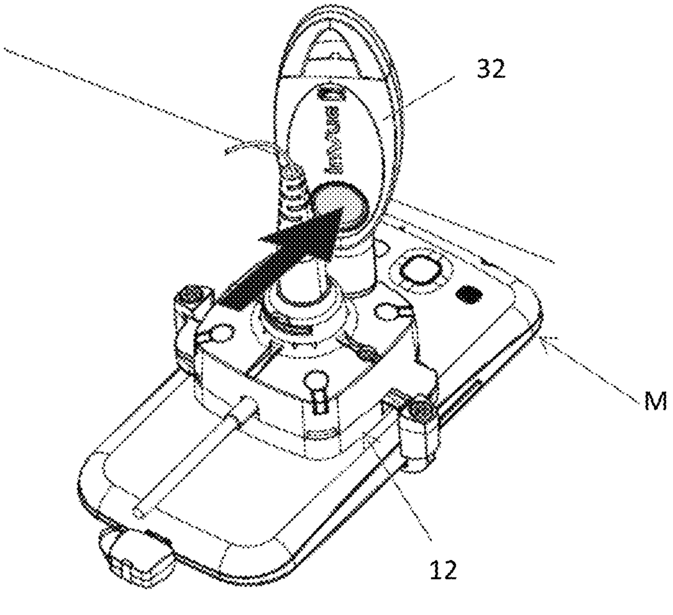
FIG. 8 illustrates a perspective view of a sensor for use with the merchandise display system of FIG. 1, according to certain aspects of the present disclosure.
Figure 9:
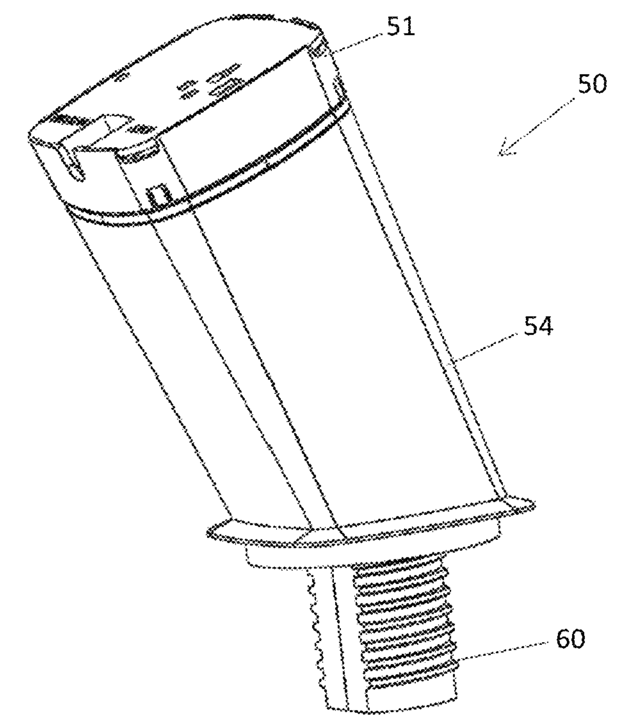
FIG. 9 illustrates a perspective view of a merchandise display system according to certain aspects of the present disclosure.
Figure 10:
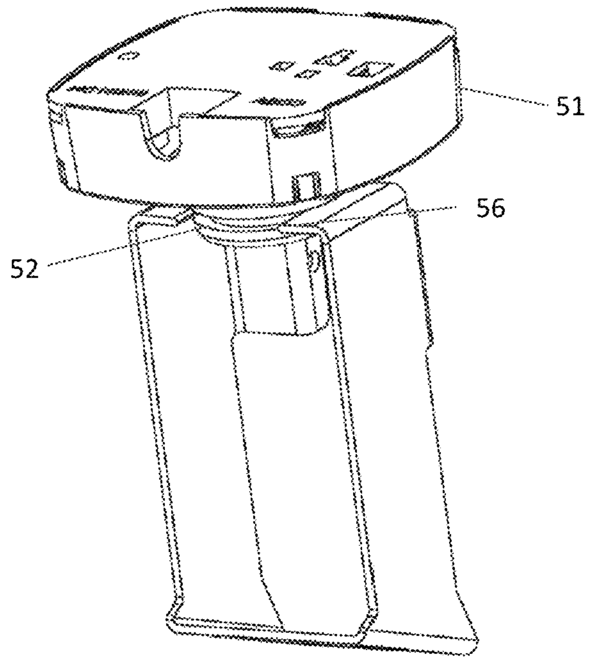
FIGS. 10 and 11 each illustrate a perspective view of a merchandise display system, in which an exterior of the base has been removed for purposes of illustration, according to certain aspects of the present disclosure.

In some embodiments, the sensor 12 is a one-piece design that is configured to be attached to the article of merchandise. In other embodiments, FIGS. 5-7 illustrate that the sensor 12 may include an upper portion 35 and a lower portion 37. The upper portion 35 may be configured to be secured to the lower portion 37, such as with a proprietary fastener 39. In addition, the upper portion 35 may be configured to be secured to the article of merchandise M, while the lower portion 37 may be configured to receive the connector 22. FIG. 7 shows that an end of the power cable 26 may be enlarged and configured to be inserted into a recess in the lower portion 37, which secures the power cable therein when the upper and lower portions are secured to one another. In addition, FIG. 6 shows that the upper portion 35 may include an engagement member 40, and FIG. 7 shows that the lower portion 37 may include an opening 42 configured to receive the engagement member 40 therein. Engagement between the engagement member 40 and the opening 42 may be used to align the upper and lower portions relative to one another prior to securing the upper and lower portions together.

Furthermore, FIGS. 1, 5-6, and 8 illustrate that the sensor 12 may include one or more arms 34 for securing the article of merchandise to the sensor. FIG. 5 shows that the upper portion 35 may include a pair of slots 36 that are configured to receive a respective arm 34 therein. Thus, each arm 34 may be configured to slide within the slots 36 to adjust the arms relative to the article of merchandise. The lower portion 37 may be secured to the upper portion 35 such that each arm 34 is secured therebetween and cannot be removed without first detaching the lower portion from the upper portion.

Embodiments of the present invention provide for the delivery of power to the article of merchandise M and/or the sensor 12 through a plurality of conductors in the tether 14. In some examples, the tether 14 includes only two conductors (e.g., a positive power line and a ground line). An input power source may be in electrical communication with the conductors for transmitting power through the tether 14 and to the sensor 12 and/or the article of merchandise M.

Figure 11:
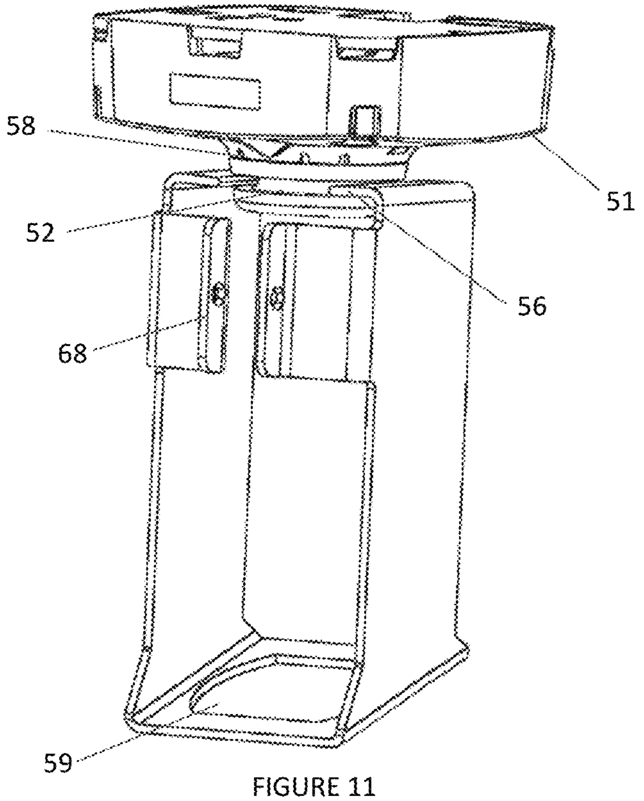
Figure 12:
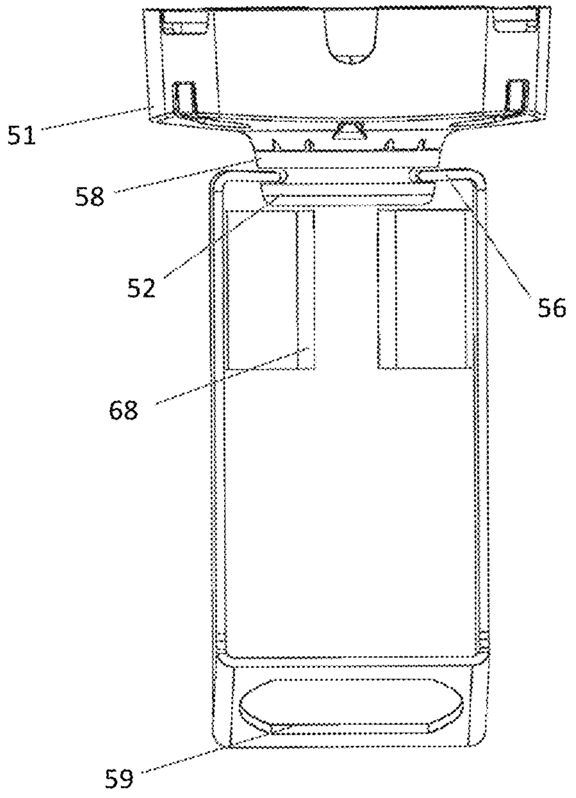
FIG. 12 illustrates a front view of a merchandise display system of FIGS. 10 and 11, in which an exterior of the base has been removed for purposes of illustration, according to certain aspects of the present disclosure.
Figure 15:
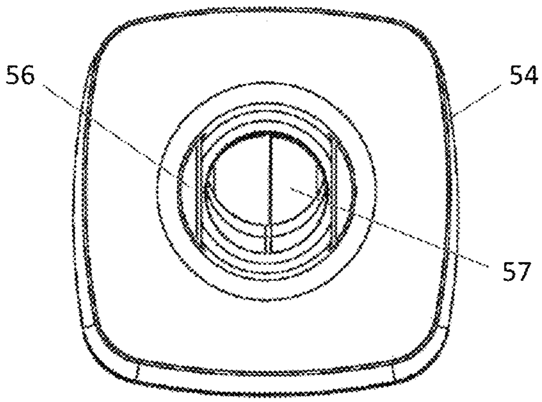
FIG. 15 illustrates a top view of a merchandise display system of FIG. 14, according to certain aspects of the present disclosure.

FIGS. 9-15 illustrate another embodiment of a display system 50. Similar to the embodiments discussed above, the display system 50 includes a sensor 51 removably supported on a base 54. As shown in FIGS. 11-12, the sensor 51 may include a base member 58 that is configured to be engaged by the base 54. In this embodiment, the sensor 51 includes at least one first engagement member 52, while the base 54 includes at least one second engagement member 56. In this example, the first engagement member 52 is a slot defined in base member 58 of the sensor 51 that extends at least partially about the circumference of the base 54. The slot may extend about the entire circumference. The second engagement member 56 may be a biased member that is configured to be biased into engagement with the first engagement member 52. For example, the second engagement member 56 may be a spring-biased member (e.g., spring steel). FIG. 15 is a top view of the display system 50 and shows that the second engagement member 56 may extend within an opening 57 defined through the base 54. The second engagement member 56 may be biased to automatically engage the first engagement member 52 when the sensor 51 is placed on the base 54. Thus, as the sensor 51 is moved to a seated position on the base 54, the second engagement member 56 may bias into engagement with the first engagement member 52. Therefore, a separate step to lock the second engagement member to the first engagement member is not required. However, it is understood that the first and second engagement members 52, 56 may be actuated into engagement with one another under operation of a key or the like.

Figure 13:
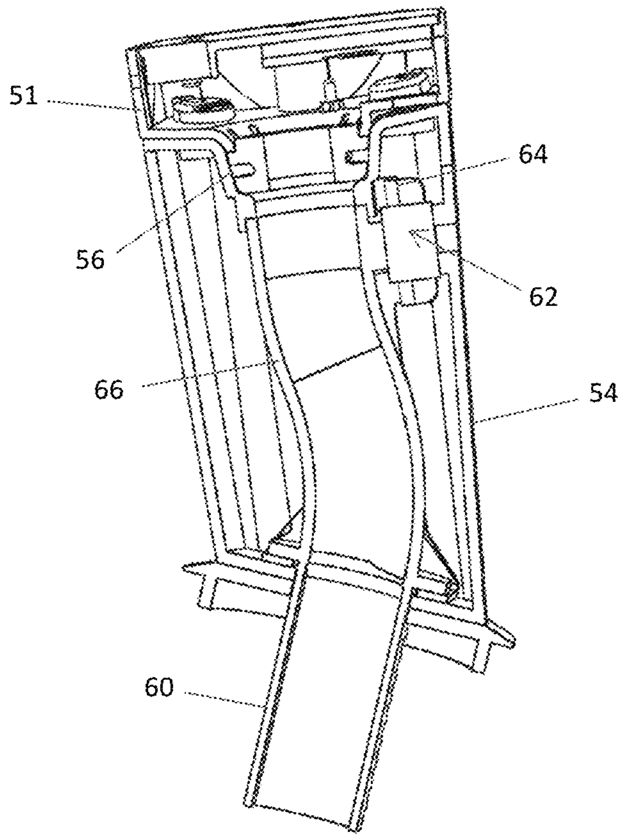
FIG. 13 illustrates a side cross-sectional view of a merchandise display system, according to certain aspects of the present disclosure.

In some cases, the second engagement member 56 may engage the first engagement member 52 at a plurality of locations. In one embodiment, the second engagement member 56 engages the first engagement member 52 on opposite sides of the base member 58 (see, e.g., FIG. 10-12, wherein the exterior of the base 54 has been removed for purposes of illustration). As shown, the second engagement member 56 may be an elongate U-shaped member, although other shapes may be employed. The second engagement member 56 may also be configured to facilitate attachment to a support surface 20. For example, the second engagement member 56 may define an opening 59 configured to receive a fastener 60 (see, e.g., FIG. 9). The fastener 60 may be configured to engage the base 54 and thereby secure the base to the support surface 20 such as via a threaded engagement with a nut. The cross-sectional view of FIG. 13 shows that the base 54 may also include a guide tube 66 that is configured to receive a tether, cord, cable, or the like. The guide tube 66 may be operably engaged with or integrated with the fastener 60 for guiding the tether through the base and below the support surface 20. It is understood that the tether may alternatively be external to the base 54, such as where an elastic cable is employed.

When the second engagement member 56 is in engagement with the first engagement member 52, the sensor 51 is locked to the base 54. Thus, the sensor 51 may not be removed from the base 54 without disassembly or otherwise damaging the sensor and/or base. In the locked position, however, the sensor 51 is rotatable about the base 54. Thus, the sensor 51 and associated article of merchandise M may rotate at least partially about the base 54 (e.g., at least about 90 degrees), and may even rotate freely about the base. As such, even when in a locked position, a consumer is able to interact with the article of merchandise M including moving the article of merchandise between different display orientations.

Figure 14:
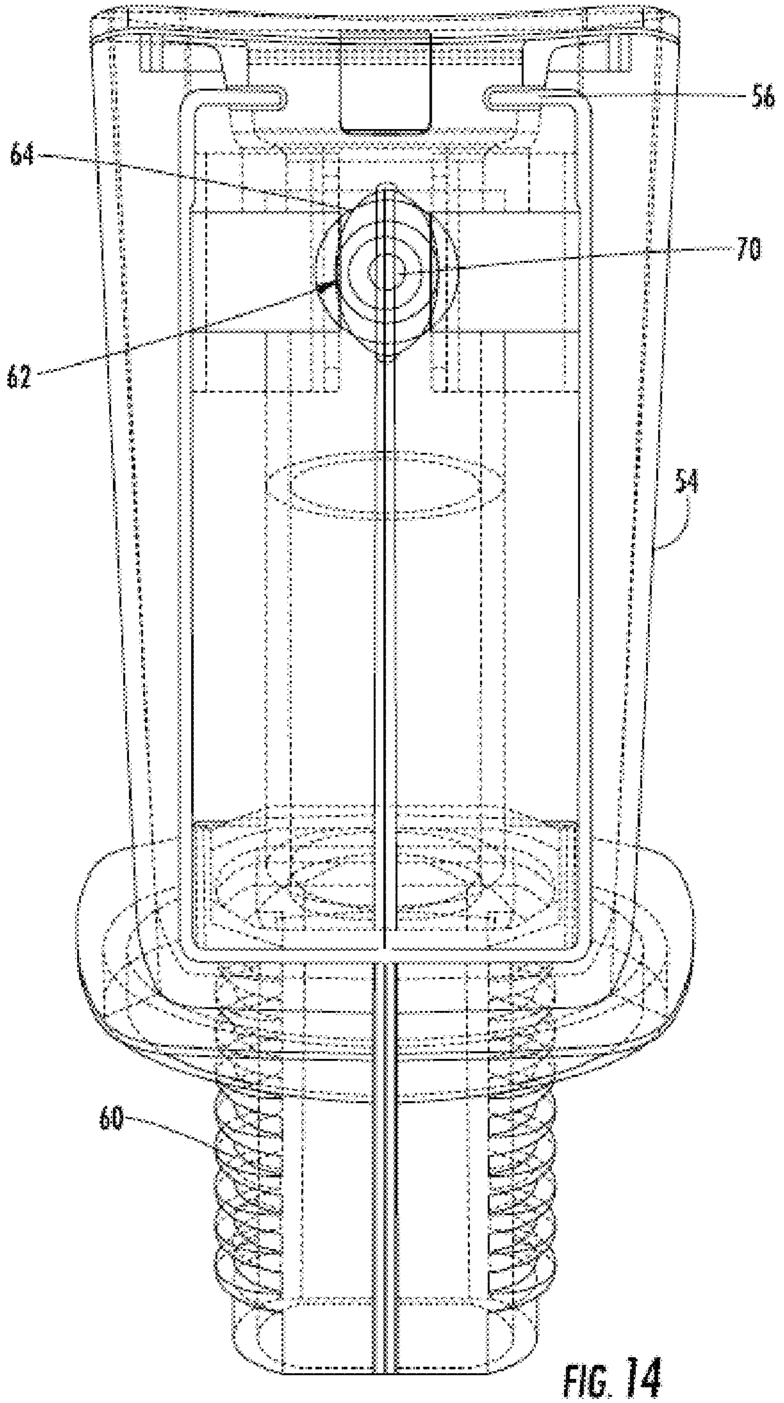
FIG. 14 illustrates a front view of a merchandise display system, in which an interior of the base is visible through the exterior of the base for purposes of illustration, according to certain aspects of the present disclosure.

The base 54 may include a release mechanism 62 that is configured to release the second engagement member 56 from the first engagement member 52 to unlock the sensor 51 from the base 54 (see, e.g., FIGS. 13-14). Thus, the release mechanism 62 may be configured to unlock the sensor 51 from the base 54 while the sensor is seated and locked to the base. In one embodiment, the release mechanism 62 is a cam mechanism 64 that is configured to bias the second engagement member 56 out of engagement with the first engagement member 52, which is a slot in this instance. For example, the second engagement member 56 may be attached to or integrated with a bracket member 68 that is configured to cooperate with the release mechanism 62. In one embodiment, rotation of the cam mechanism 64 engages the bracket member 68 to thereby bias the engagement member 56 outwardly and out of engagement with the first engagement member 52. The release mechanism 62 may be configured to cooperate with a key to rotate or otherwise actuate the cam mechanism 64. The key could be any suitable type, such as a proprietary tool configured to mate with a proprietary shape on the release mechanism 62. For instance, FIG. 14 shows that the base 54 may define an access opening 70 that is configured to receive an appropriate key. Thus, the release mechanism 62 allows for a quick-release of the sensor 51 from the base 54.

Figure 16:
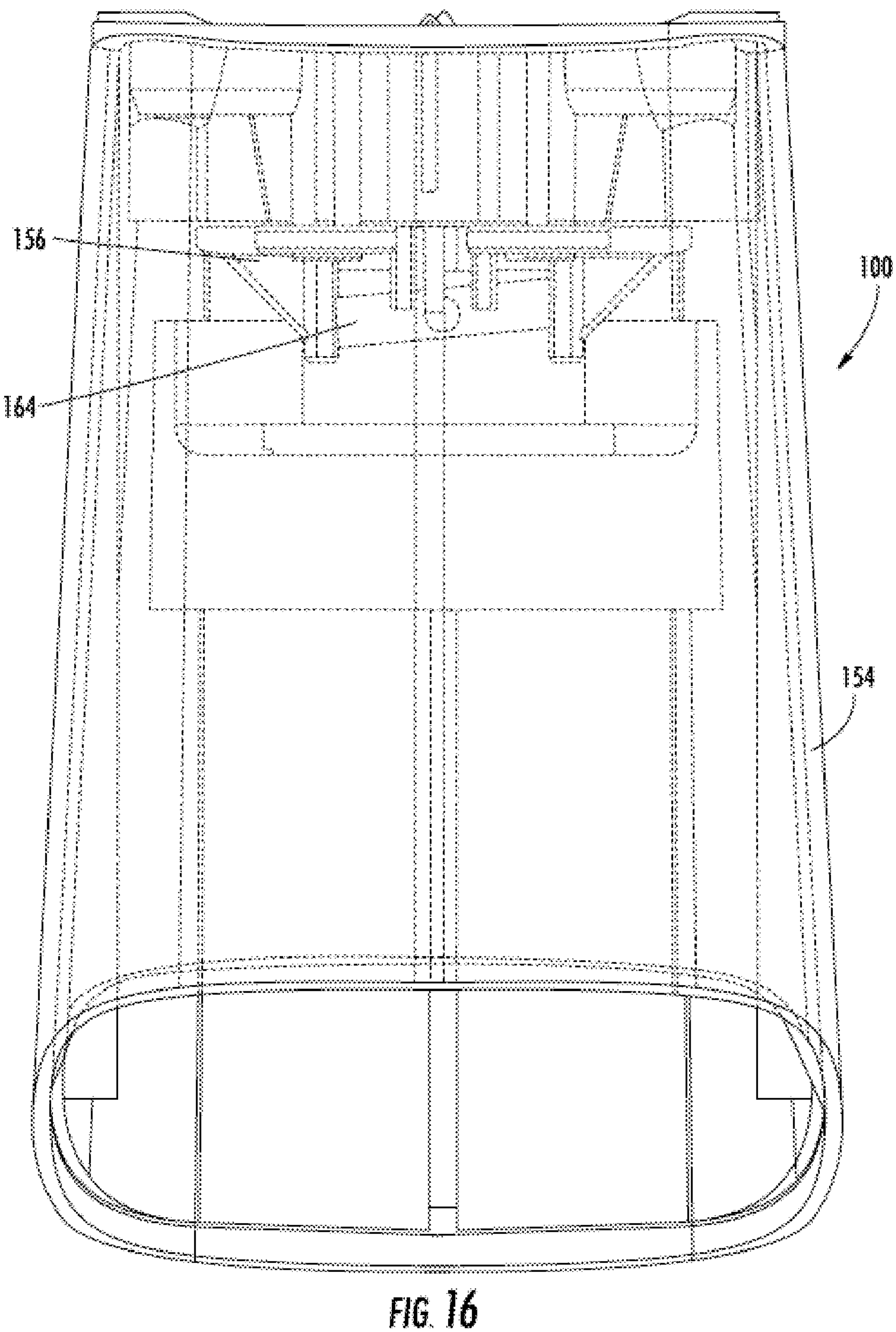
FIG. 16 illustrates a front view of a merchandise display system, in which an interior of the base is visible through the exterior of the base for purposes of illustration, according to certain aspects of the present disclosure.
Figure 17:
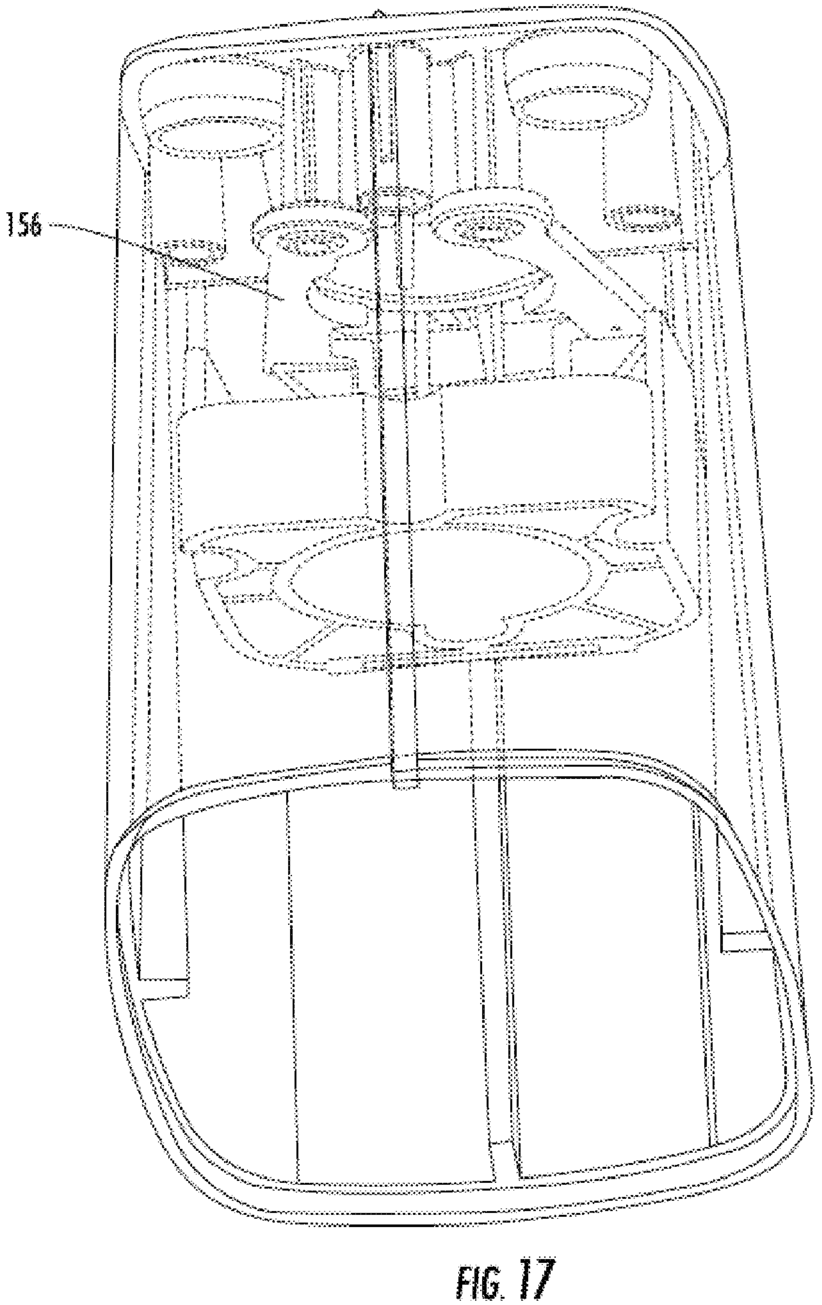
FIGS. 17 and 18 each illustrate a perspective view of a merchandise display system of FIG. 16, in which an interior of the base is visible through the exterior of the base for purposes of illustration, according to certain aspects of the present disclosure.
Figure 18:
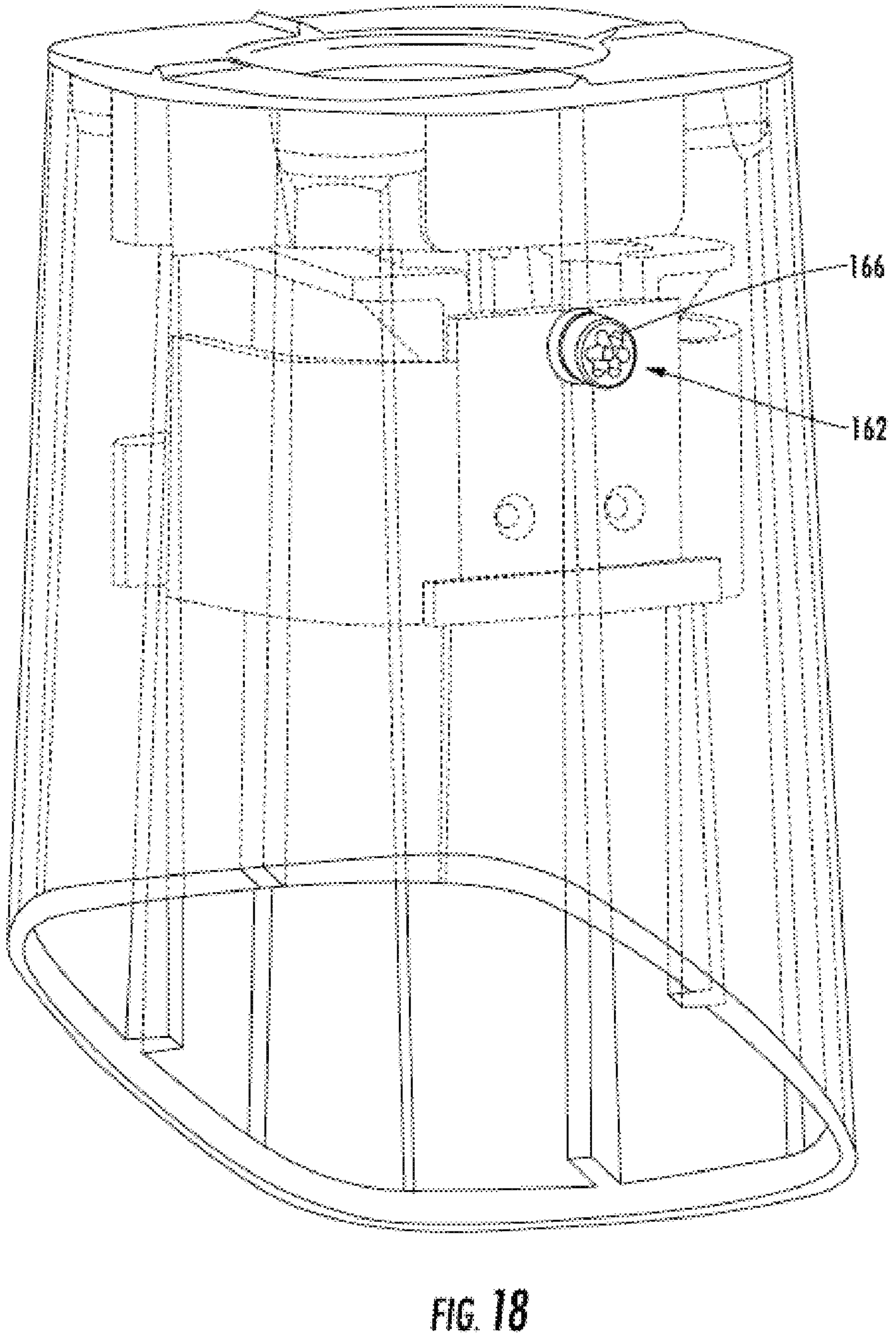

FIGS. 16-18 illustrate another embodiment of a merchandise security system 100. In this embodiment, at least one second engagement member 156 is biased towards an engaged position. For instance, the second engagement members may be spring biased towards an engaged position. Shown are a pair of second engagement members 156, wherein each engagement member is configured to pivot about a respective axis. As before, the second engagement members 156 are configured to engage a first engagement member 52 of the sensor 51 (not shown) and thereby lock the sensor to the base 154. Similar to that described above, the system 100 may include a release mechanism 162. The release mechanism 162 may be configured to lock and/or unlock the sensor to or from the base 154. For example, rotation of a cam mechanism 164 may cause the second engagement members 156 to rotate either towards an engaged position with the sensor or a disengaged position out of engagement with the sensor. The release mechanism 162 may include a fastener 166 coupled to the cam mechanism 164, and rotation of the cam mechanism may occur as a result of rotation of the fastener. Thus, rotation of the fastener 166 and associated cam mechanism 164 may bias the second engagement members 156 out of engagement with the sensor. In some cases, the cam mechanism 164 may be configured to engage the second engagement members and hold the second engagement members in an unlocked position. As also discussed above, the release mechanism may be configured to be actuated with a key, such as a proprietary tool.

Figure 22:
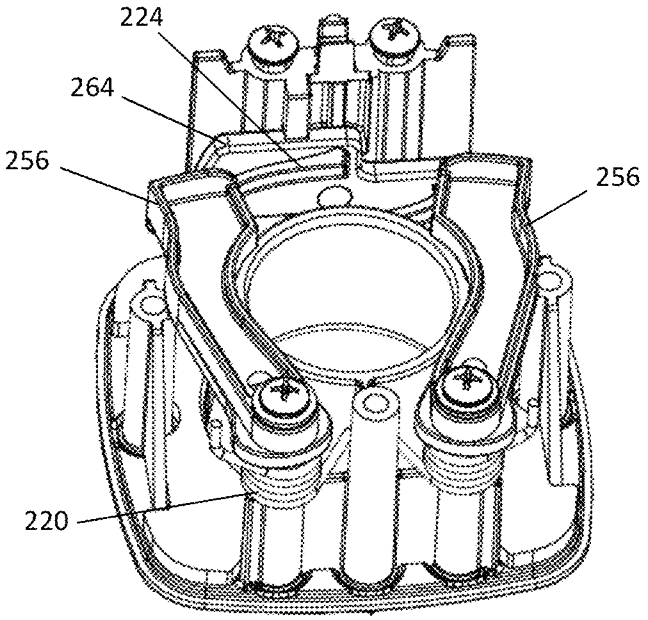
FIG. 22 illustrates an enlarged bottom perspective view of a merchandise display system of FIG. 19, including second engagement members, in which portions of the base have been removed for purposes of illustration, according to certain aspects of the present disclosure.
Figure 23:
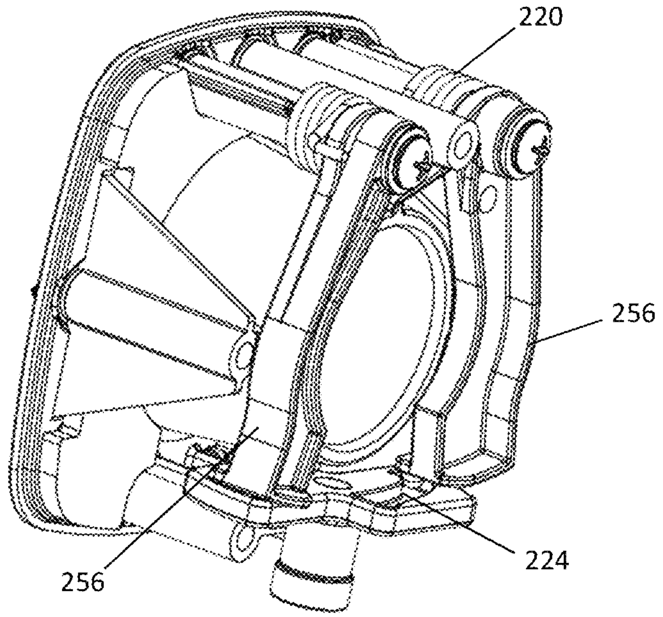
FIG. 23 illustrates an enlarged side perspective view of a merchandise display system of FIG. 19, including second engagement members, in which portions of the base have been removed for purposes of illustration, according to certain aspects of the present disclosure.

FIGS. 19-23 illustrate another embodiment of a merchandise security system 200 (wherein the exterior of the base 254 has been removed from FIGS. 20-23 for purposes of illustration). In this embodiment, at least one second engagement member 256 is biased towards a disengaged position. For instance, the second engagement members may be spring biased towards a disengaged position with a respective spring 220. Shown are a pair of second engagement members 256, wherein each engagement member is configured to pivot about a respective axis. As before, the second engagement members 256 are configured to engage a first engagement member 52 of the sensor 51 (not shown) and thereby lock the sensor to the base 254. Similar to that described above, the system 200 may include a release mechanism 262. The release mechanism 262 may be configured to lock and/or unlock the sensor to or from the base 254. For example, rotation of a cam mechanism 264 may cause the second engagement members 256 to rotate either towards an engaged position with the sensor 51 or a disengaged position out of engagement with the sensor. Thus, rotation of the cam mechanism 264 may overcome the spring bias and move the second engagement members 256 into engagement with the sensor. As shown in FIGS. 22-23, the cam mechanism 264 may include one or more slots 224 configured to receive a respective second engagement member 256 therein and guide the second engagement members between engaged and disengaged positions. The cam mechanism 264 may be configured to guide the second engagement members 256 between predetermined engaged and disengaged positions. For instance, rotation of a fastener 266 engaged with or otherwise coupled to the cam mechanism 264 in one direction may move the second engagement members 256 to an engaged position, while rotation of the fastener in an opposite direction may move the second engagement members to a disengaged position. In some cases, the cam mechanism 264 is configured to rotate about an axis of the fastener 266, while the second engagement members 256 are configured to move within a plane between the engaged and disengaged positions. As also discussed above, the release mechanism 262 may be configured to be actuated with a key, such as a proprietary tool. In some embodiments, the fastener 266 may be configured to be rotated less than a complete revolution or turn in order to move the second engagement members 256 between disengaged and engaged positions. For instance, the fastener may be configured to be rotated a ¼ turn, ½ turn, or ¾ turn to move the second engagement members 256 between the disengaged and engaged positions.

Figure 19:
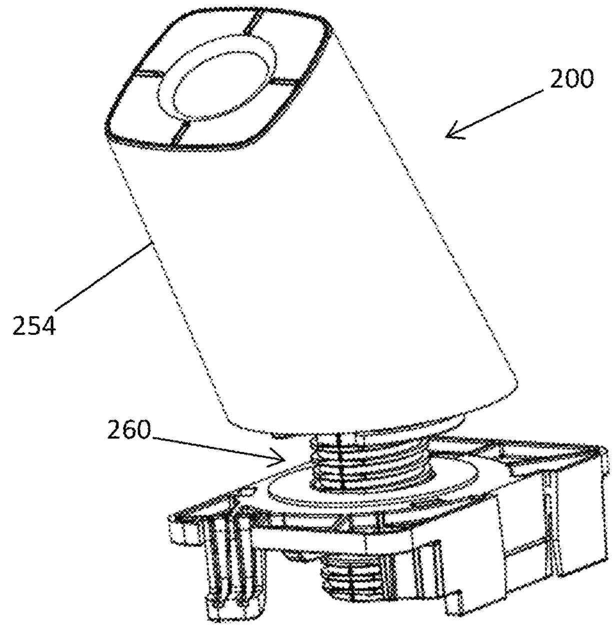
FIG. 19 illustrates a perspective view of a merchandise display system, according to certain aspects of the present disclosure.
Figure 20:
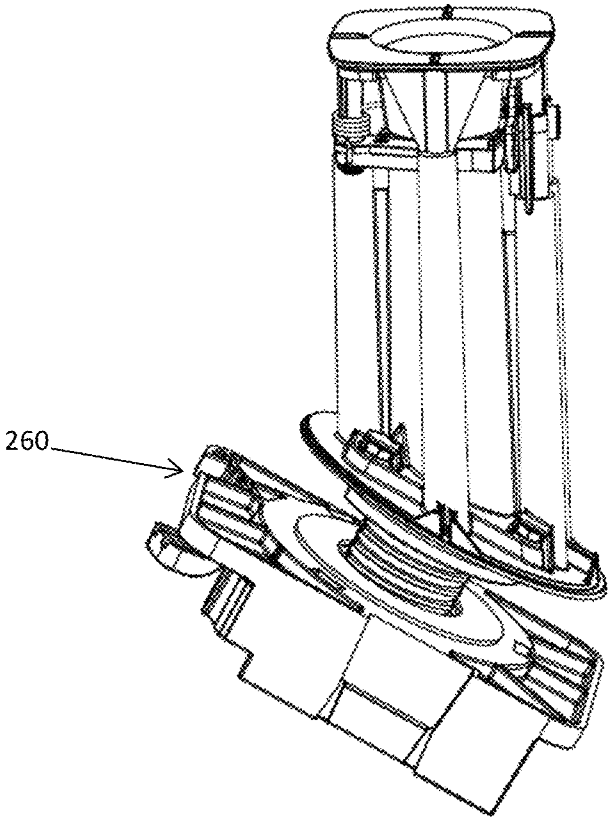
FIG. 20 illustrates a side view of a merchandise display system of FIG. 19, in which an exterior of the base has been removed for purposes of illustration, according to certain aspects of the present disclosure.
Figure 21:
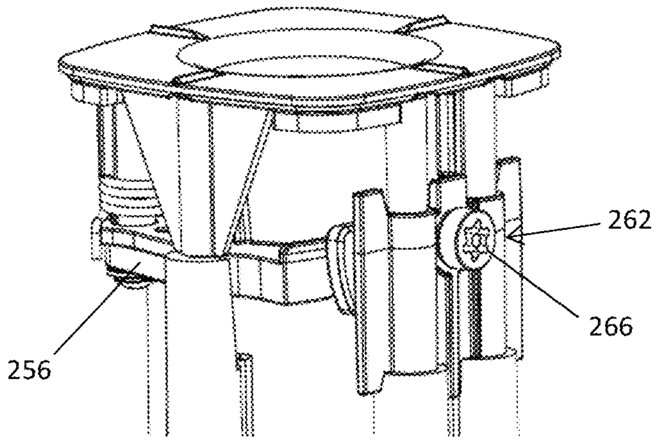
FIG. 21 illustrates an enlarged perspective view of a merchandise display system of FIG. 19, in which an exterior of the base has been removed for purposes of illustration, according to certain aspects of the present disclosure.

FIGS. 19 and 20 also demonstrate that a base assembly 260 may be provided for facilitating attachment to a support surface 20 (not shown). For example, the base 254 may be configured to be coupled to the base assembly 260. The base assembly 260 may be configured to engage the base 254 and thereby secure the base to the support surface 20 such as via a threaded engagement with a nut. Similar to that described above, the base assembly 260 may also be configured to receive a tether, cord, cable, or the like for guiding the tether through the base 245 and below the support surface 20.

The foregoing has described one or more embodiments of merchandise security systems and methods for displaying and protecting an article of merchandise. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. A merchandise display system for displaying an article of merchandise comprising:

a sensor configured to be secured to the article of merchandise and to detect removal of the article of merchandise from the sensor;

a tether attached to the sensor at one end;

a base configured to removably support the sensor thereon such that the sensor is configured to be removed from the base and seated on the base, the base defining an opening configured to receive the tether and allow the tether to extend and retract relative to the base, the base comprising a plurality of engagement members configured to releasably lock the sensor to the base when the sensor is seated on the base; and a cam mechanism in operable engagement with the plurality of engagement members and configured to be rotated to cause the plurality of engagement members to move inward within the opening for locking the sensor on the base, the cam mechanism further configured to be rotated to cause the plurality of engagement members to move outward for unlocking the sensor from the base.

2. The merchandise display system of claim 1, wherein the cam mechanism is configured to be rotated less than a complete revolution in order to lock the sensor to the base.

3. The merchandise display system of claim 1, wherein the cam mechanism is configured to be rotated with a key less than a complete revolution in order to lock the sensor to the base.

4. The merchandise display system of claim 1, further comprising a key configured to rotate the cam mechanism.

5. The merchandise display system of claim 1, wherein the plurality of engagement members are configured to move within a plane that is perpendicular to an axis extending through the opening.

6. The merchandise display system of claim 1, wherein the plurality of engagement members are configured to engage an engagement member of the sensor for locking the sensor on the base.

7. The merchandise display system of claim 6, wherein the engagement member of the sensor comprises a slot.

8. The merchandise display system of claim 1, further comprising a power source configured to provide power for powering the article of merchandise.

9. The merchandise display system of claim 1, wherein the cam mechanism is configured to rotate in a first plane, and wherein the plurality of engagement members are configured to move inward and outward along a second plane different than the first plane.

10. The merchandise display system of claim 1, wherein the cam mechanism is configured to guide the plurality of engagement members between predetermined engaged and disengaged positions.

11. The merchandise display system of claim 1, wherein the plurality of engagement members are configured to move radially inward and radially outward.

12. The merchandise display system of claim 1, wherein the sensor comprises an alarm configured to generate an audible alarm in response to removal of the article of merchandise from the sensor.

13. The merchandise display system of claim 1, wherein the cam mechanism is configured to guide the plurality of engagement members between predetermined engaged and disengaged positions.

14. The merchandise display system of claim 1, wherein the plurality of engagement members are configured to move radially opposite one another in response to rotation of the cam mechanism.

15. The merchandise display system of claim 1, wherein the sensor is configured to rotate with respect to the base while locked thereto.

16. The merchandise display system of claim 1, wherein the plurality of engagement members are biased to move inward within the opening.

17. The merchandise display system of claim 1, wherein the cam mechanism is configured to cause the plurality of engagement members to rotate inward within the opening for locking the sensor on the base or outward for unlocking the sensor from the base.

18. The merchandise display system of claim 1, wherein the cam mechanism is configured to cause the plurality of engagement members to pivot inward within the opening for locking the sensor on the base or outward for unlocking the sensor from the base.

19. The merchandise display system of claim 1, further comprising a key-actuated mechanism configured to actuate the cam mechanism.

20. The merchandise display system of claim 1, wherein the cam mechanism is configured to engage the plurality of engagement members when moving the plurality of engagement members inward and outward within the opening.

* * * * *